US009002541B2

(12) United States Patent
Fezzazi et al.

(10) Patent No.: US 9,002,541 B2
(45) Date of Patent: Apr. 7, 2015

(54) METHOD, DEVICE, AND COMPUTER REDABLE MEDIA FOR AUTOMATIC MANAGEMENT OF CONFIGURATION AND RECONFIGURATION OF A PLURALITY OF SYSTEMS OF AN AIRCRAFT

(71) Applicant: Airbus Operations SAS, Toulouse Cedex (FR)

(72) Inventors: Samir Fezzazi, La Salvetat Saint Gilles (FR); Stephane Porez, Quint-Fonsegrives (FR)

(73) Assignee: Airbus Operations (S.A.S.), Toulouse (FR)

( * ) Notice: Subject to any disclaimer, the term of this patent is extended or adjusted under 35 U.S.C. 154(b) by 14 days.

(21) Appl. No.: 13/905,907

(22) Filed: May 30, 2013

(65) Prior Publication Data

US 2014/0200747 A1    Jul. 17, 2014

(30) Foreign Application Priority Data

Jan. 11, 2013    (FR) ...................................... 13 50248

(51) Int. Cl.
*B64C 19/02*    (2006.01)
*G05B 23/02*    (2006.01)

(52) U.S. Cl.
CPC ............ *B64C 19/02* (2013.01); *G05B 23/0208* (2013.01)

(58) Field of Classification Search
CPC ....................................................... B64C 19/02
USPC ............................................................ 701/3
See application file for complete search history.

(56) References Cited

U.S. PATENT DOCUMENTS

| 4,868,755 | A | * | 9/1989 | McNulty et al. | ................... 701/1 |
| 6,427,122 | B1 | * | 7/2002 | Lin | ............................... 701/472 |
| 6,516,272 | B2 | * | 2/2003 | Lin | ............................... 701/472 |
| 8,555,244 | B2 | * | 10/2013 | Harrison | ....................... 717/113 |
| 2010/0161157 | A1 | | 6/2010 | Guilley et al. | |
| 2011/0254704 | A1 | * | 10/2011 | Fournier et al. | ............... 340/945 |

FOREIGN PATENT DOCUMENTS

FR    2 935 818    3/2010

OTHER PUBLICATIONS

French Search Report for Application No. FR 1350248 dated Oct. 30, 2013.

* cited by examiner

*Primary Examiner* — Mary Cheung
*Assistant Examiner* — Anne Mazzara
(74) *Attorney, Agent, or Firm* — Jenkins, Wilson, Taylor & Hunt, P.A.

(57) ABSTRACT

Methods, devices, and computer readable media are disclosed for automatic management of configuration and reconfiguration procedures of a plurality of systems of an aircraft, for example and without limitation, for aircraft operational and maintenance uses. In some aspects, a centralized device for automatic management of configuration and reconfiguration procedures of a plurality of systems of an aircraft includes a central unit for automatically generation control commands for automatic control of at least one action to be executed for one or both of the configuration or reconfiguration procedure, data links for automatic dispatch of control commands to corresponding systems for automatic execution.

17 Claims, 2 Drawing Sheets

METHOD, DEVICE, AND COMPUTER REDABLE MEDIA FOR AUTOMATIC MANAGEMENT OF CONFIGURATION AND RECONFIGURATION OF A PLURALITY OF SYSTEMS OF AN AIRCRAFT

CROSS-REFERENCE TO RELATED APPLICATION

This application claims priority to French Patent Application No. 13 50248 filed on Jan. 11, 2013, the entire content of which is incorporated by reference herein.

TECHNICAL FIELD

The subject matter described herein relates generally to systems for aircraft operation. More particularly, the subject matter disclosed herein relates to methods, devices, and computer readable media for automatic management of configuration and reconfiguration procedures of a plurality of systems of an aircraft, during both normal and abnormal situations of an aircraft's operation.

BACKGROUND

Modern airplanes can be equipped with a centralized monitoring system, such as for example an Electronic Centralized Aircraft Monitoring (ECAM) system. An ECAM type system can detect and diagnose aircraft situations in which a configuration procedure may be needed during normal situations, and then display lists of actions to be carried out for a configuration procedure. During abnormal situations, the ECAM system can detect and diagnose aircraft system failures and requesting a reconfiguration procedure, and then display lists of actions to be carried out for a reconfiguration procedure.

The management of the aircraft's systems, however, is still carried out by the crew who, although assisted by the alerts and the ECAM procedures, must execute all of the management tasks of all of the systems concerned, with the aid of the normal ECAM lists during normal situations. Similarly, during abnormal situations, the crew members with the assistance of the ECAM procedures must try to detect system failures which may be difficult for the systems to detect, for example high vibrations of an engine, perform diagnosis or supplemental diagnosis of system failures, and manage reconfigurations of systems. In addition, the crew members may be required to make decisions on whether to conduct ECAM procedures to the execution of configuration or reconfiguration actions, and then make verification on the proper execution of the actions.

Hence, although assisted by means for monitoring and presenting information, the crew's workload remains significantly burdensome. Accordingly, there is a need for methods, devices, and computer readable media for centralizing automatic management of configuration and reconfiguration procedures while an aircraft is in operation, under both normal and abnormal situations.

SUMMARY

According to one aspect, the subject matter described herein can comprise a device for automatic management of configuration and reconfiguration procedures of a plurality of systems of an aircraft. The device can include a central unit for automatically generating, in normal or abnormal situations, when a configuration or reconfiguration procedure is required, control commands for automatic control of at least one action to be executed for one or both of the configuration or reconfiguration procedures, and data links for automatic dispatch of control commands to corresponding systems for automatic execution. The centralized device can be configured to detect and diagnose situations which require a configuration of a system or of multiple systems, and make available lists of actions to be carried out for a configuration procedure. The device can also detect and diagnose system failures and request a reconfiguration, and make available lists of actions to be executed for a reconfiguration procedure.

According to another aspect, the subject matter described herein can comprise a method for automatic management of configuration and reconfiguration procedures of a plurality of systems of an aircraft. The method can include detecting and diagnosing situations which require a configuration of a system or of multiple systems, detecting and diagnosing system failures and requesting a reconfiguration, making available lists of actions to be carried out for a configuration or reconfiguration procedure, automatically generating control commands for the configuration or reconfiguration procedures, and automatically dispatching the control commands to corresponding systems for execution.

The subject matter described herein can be implemented in software in combination with hardware and/or firmware. For example, the subject matter described herein can be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein can include non-transitory computer readable media such as, for example and without limitation, disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, of which.

DETAILED DESCRIPTION

Figure 1:
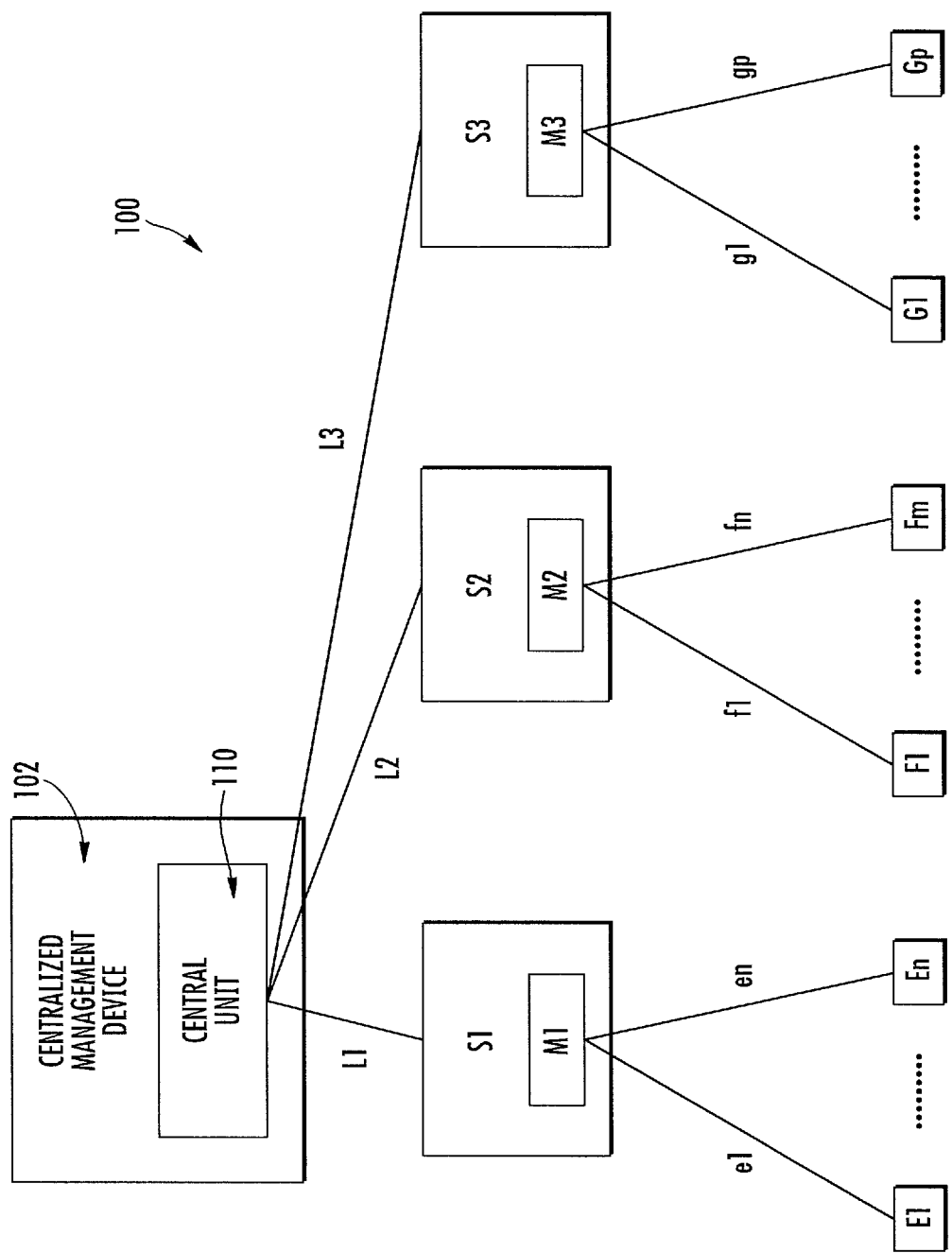
FIG. 1 is a schematic diagram of a centralized management device of an aircraft in accordance with aspects of the subject matter described herein.

In accordance with the description herein and exemplary, associated drawings, novel methods, devices, and computer readable media are disclosed for a centralized device for automatic management of configuration and reconfiguration of a plurality of systems of an aircraft. Such methods, devices and computer readable media are particularly suitable for use, for example and without limitation, for aircraft operational use during normal and abnormal flight situations.

Modern aircrafts can be equipped with a centralized monitoring system, such as an Electronic Centralized Aircraft Monitoring (ECAM) system to assist the crew in performing high level systems management and monitoring during normal and abnormal aircraft operations. An ECAM type system can detect and diagnose aircraft situations in which a configuration procedure is needed during normal situations, and then display lists of actions to be carried out for a configuration procedure. A normal situation can be a situation in which while the aircraft's systems are operating normally, and yet the state of certain systems of the aircraft may still have to be modified by a configuration procedure. Similarly, during abnormal situations, the ECAM system can detect and diagnose aircraft system failures and requesting a reconfiguration procedure, and then display lists of actions to be carried out for a reconfiguration procedure. An abnormal situation can be a situation where at least one of the aircraft's systems is faulty and actions have to be carried out to allow compliant operation of that system. Furthermore, the ECAM system can use a flight alert system to generate various messages and alerts. For example, in a normal situation, a Flight Warning System (FWS) can be used by the ECAM to generate various messages to both increase the crew's situation awareness and reduce their workload. Similarly, during abnormal situations, the ECAM can utilize the FWS to generate various alerts to the crew members.

Notably, aspects of the subject matter described herein can be configured to provide a centralized device for automatic management of the configuration and reconfiguration of a plurality of systems or multiple systems of an aircraft to detect and diagnose situations which may require a configuration of a system or of multiple systems, and making available lists of actions to be carried out for a configuration procedure during normal situations. Similarly, during abnormal situations the device can detect and diagnose system failures and request a reconfiguration, and then display lists of actions to be carried out for a reconfiguration procedure. Furthermore, under normal situations in which a configuration procedure is required, the centralized device can automatically generate control commands for automatically controlling at least some of the actions to be carried out for the configuration procedure; and during abnormal situations, the centralized device can automatically generate control commands for control at least some of the actions for a reconfiguration procedure. The centralized device can also be configured to automatically dispatch control commands generated to corresponding systems to carry out corresponding actions automatically. In some aspects, the centralized device can check and manage multiple systems directly and automatically by automatically control the execution of actions to be carried out via the generation and issuing of control commands. For example, an ECAM type centralized management device can generate and issue control commands to configure multiple systems in a normal situation and reconfigure multiple systems during system failures. The configurations and reconfigurations can be performed when an aircraft is either in flight or on the ground. For example, the aircraft's ECAM can conduct system configurations or reconfigurations during an aircraft's ground rollout phase at an airport.

In some aspects, the centralized management device can include a single central unit which can manage the configuration and reconfiguration functions automatically and also dispatches control commands to linked system managers automatically. The central unit can manage the configuration and reconfiguration procedures by issuing control commands for actions to be carried out by various elements or components of systems, by relying on a network of system managers and without having to be linked directly to each individual elements or components of an aircraft system. Each of the system managers can be configured to automatically manage the execution of the actions to be carried out by elements of the system to which it is associated. These system managers can be linked to functions already present to a system, or to functions provided specially to a system for the implementation of the present subject matter. As such, a plurality of system managers can be associated with a plurality of corresponding systems of an aircraft and automatically manage the execution of actions to be carried out by elements of a system with which it is associated, both during a configuration and during a reconfiguration procedure, as a function of control commands received from the central unit.

The central unit can also include a man/machine interface comprising display units. For example, the central unit can be configured to be able to display, on at least one screen of the display unit, lists of actions to be carried out for a configuration or a reconfiguration procedures, as well as alert messages. Moreover, the central unit can be configured to control the execution of the actions to be carried out, in sequence or at least in part in parallel, as a function of the procedure considered, and/or to make it possible to integrate non-automatic actions, such as control commands inserted by a crew, into a list of actions to be carried out. In addition, each of the system managers can be configured to detect and diagnose situations which require a configuration of a system or of multiple systems, detect and diagnose system failures and request a reconfiguration, and control and execute actions by elements of the corresponding systems and verify such executions. The centralized management device can be configured to also execute actions during maintenance procedures, via the central unit and system managers.

FIG. 1 depicts an exemplary illustration of a schematic diagram generally designated 100 of a centralized management device in accordance with embodiments of the subject matter described herein. As shown in FIG. 1, a centralized management device 102 can be configured for the automatic management of the configuration and reconfiguration of a plurality of systems Si (or multiple systems), i being an integer greater than 1, in this instance S1, S2 and S3, of an aircraft (not represented), for example, a transport airplane. The plurality of systems Si or multiple systems can be various onboard systems, for example a system for managing the engines, or a management system of the aircraft's electrical components. The centralized management device 102 can be configured to manage multiple avionic systems, both in normal and abnormal situations of an aircraft. A normal situation can be a situation in which all the systems of the aircraft are operating normally. In such a situation, the state of certain systems may however have to be modified by a configuration procedure nevertheless. An abnormal situation can be a situation where at least one system of the aircraft is operating at a faulty state and actions have to be executed to presume a normal operation of the system and/or the aircraft. In such a situation, the state of one or more systems may be modified by a reconfiguration procedure.

In some aspects, a central unit 110 can be integrated at least in part into the centralized management device 102 and can be configured to detect and diagnose situations which require a configuration of a system or of multiple systems and make available lists of actions to be carried out for a configuration procedure under normal situations. During abnormal situations, the centralized management device 102 can be configured to detect and diagnose faulty system operations and requesting a reconfiguration and make available lists of actions to be carried out for a reconfiguration procedure. In addition, the centralized management device 102 can be configured to automatically generate, in normal situations, when a configuration procedure is required, control commands for automatic control of at least some of the actions to be executed for the configuration procedure and automatically generate, in abnormal situations, when a reconfiguration procedure is required, control commands for automatically control of at least some of the actions to be executed for the reconfiguration procedure and without intervention from the crew, automatically dispatch the control commands generated to corresponding systems for automatic execution of the corresponding actions. As such, the centralized management device 102 can check and manage multiple systems S1, S2, and S3 directly and automatically, by automatically controlling the execution of actions to be carried out. For example, an ECAM type centralized management device can reduce the task of managing systems S1 to S3 for the crew and lighten their workload, during either a configuration procedure in a normal situation, or a reconfiguration procedure during an abnormal situation.

In another aspect, the centralized management device 102 can include a central unit 110, which can automatically manage the configuration and reconfiguration procedures, and can automatically dispatch control commands to system managers M1, M2, M3, to which it is linked by links L1, L2 and L3 respectively. In addition, the system managers M1, M2, M3, can each form part of one of the systems S1, S2, S3 of the aircraft. Each system manager M1, M2, M3 can automatically manage the execution of the actions to be carried out by elements of the system with which it is associated, both during a configuration and a reconfiguration, as a function of the control commands received from the central unit 110.

Furthermore, the system S1 can include elements or components E1, ..., En, n being an integer, which can be controlled by the system manager M1 via respectively links e1, ..., en; the system S2 can include elements or components F1, ..., Fm, m being an integer, which can be controlled by the system manager M2 via respectively links f1, ..., fm; and the system S3 can include elements or components G1, ..., Gp, p being an integer, which can be controlled by the system manager M3 via respectively links g1, ..., gp. These elements E1 to En, F1 to Fm and G1 to Gp, for which actions have to be carried out, such as for example activation or deactivation of an aircraft system, can correspond to various elements of the aircraft such as pumps, valves, and actuators, etc. As such, the central unit 110 can manage the configuration and reconfiguration procedures by issuing control commands for actions to be executed by various elements E1 to En, F1 to Fm and G1 to Gp of systems S1 to S3 of the aircraft, without having to be linked directly to such individual elements, the central unit 110 can instead use a network of system managers such as M1 to M3. Each of the system managers M1, M2, and M3 can be configured to automatically manage the execution of the actions to be carried out by elements of the system S1 to S3. The system managers M1, M2, and M3 can be either already present on a system, or can be provided specially to a system. For example, an aircraft's fuel management system can already include a system manager, while its external lighting system does not comprise any system manager.

The central unit 110 does not need to be linked to each of the elements to control the systems S1, S2 and S3, but only to the system managers M1, M2, and M3. As such, the number of connections can be limited and therefore simplifies the overall implementation of the present subject matter.

Figure 2:
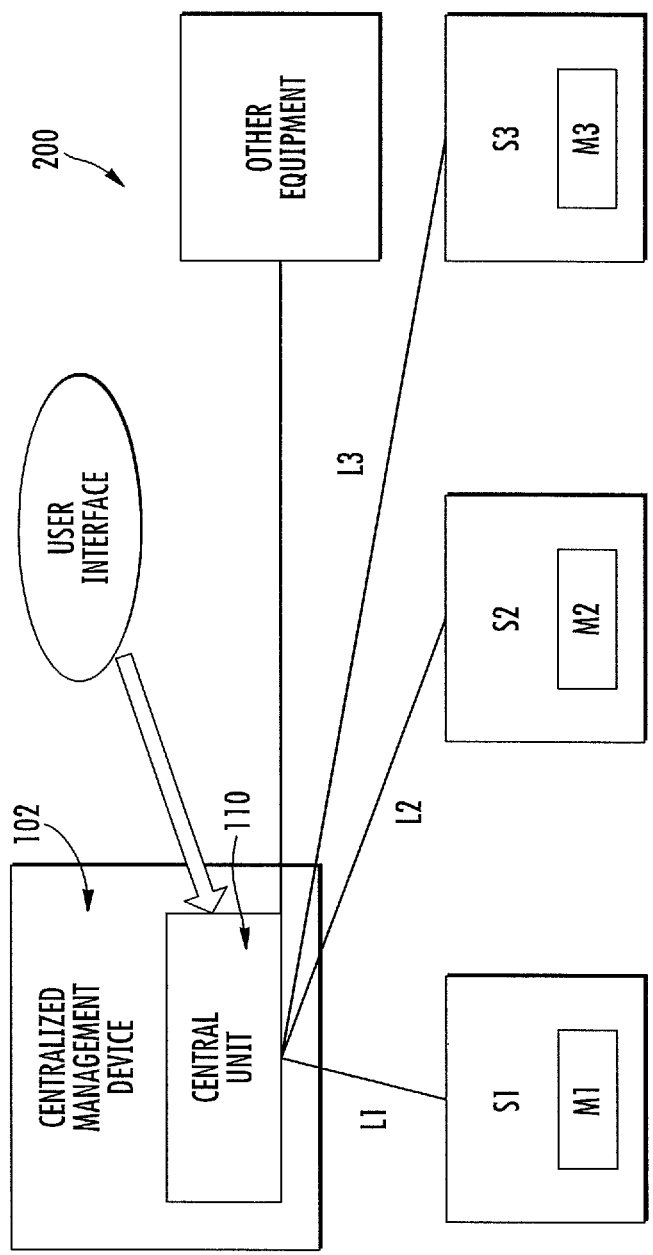
FIG. 2 is a schematic illustration of various components of an associated central unit and an associated system manager forming part of a centralized management device in accordance with aspects of the subject matter described herein.

FIG. 2 depicts an exemplary illustration of a schematic illustration generally designated 200 showing various components of an associated central unit and of an associated system manager, forming part of a centralized management device in accordance with embodiments of the subject matter described herein. As shown in FIG. 2, a central unit 110 can be configured to perform system diagnoses with measured or calculated values or parameters received via system managers M1, M2, and M3 through links L1, L2, to L3 or through a direct link from various other equipment, then deciding whether or not to execute a configuration or reconfiguration procedure, generating control commands for system managers M1, M2, and M3, and offering the option to verify the execution of the control commands. And all these functions can be performed through a processing unit integrated into the central unit 110.

Furthermore, the central unit 110 can include a man/machine interface configured to allow access to the centralized management device 102, as well as a display unit including at least one screen. The screen can be a touch screen, and control commands can be entered via direct contact with appropriate zones of the touch screen. Moreover, the control commands can be executed either in sequence, meaning one control command is issued after a confirmation of the execution of the previous command or in parallel, meaning certain control commands can be executed at the same time. The central unit 110 can also integrate non-automatic actions into a list of to be executed actions. For example, a non-automatic action can be an act such as a crew forewarning the air traffic control about an engine failure.

In some aspects, the central unit 110 can be implemented using a non-transitory computer readable medium having stored thereon computer executable instructions that when executed by a processor of a computer control the computer to perform steps.

Furthermore, in another aspect, the central unit 110 can for example be implemented in three redundant forms. For example, three identical yet independent central units 110 can be implemented within an aircraft, like various other aircraft systems. In another aspect, a main central unit 110 can be implemented with an identical backup unit in case of an operation failure with the main unit. The central unit 110 and centralized management device 102 can be configured to first utilize a FWS like logic to manage system failures, which is designed to diagnose multiple system failures or several failure within a single system, then based on aircraft operational values, such as speed and altitude, and system statuses, such as the impact on the remaining engines when one engine loses power, to decide whether to perform a configuration or a reconfiguration procedure, as well as the priority of the actions to be taken, and then verify the actions to be taken through another FWS like logic sequence.

Furthermore, as shown in FIG. 2, each system manager can include a processing unit and can be configured to obtain current aircraft operational values and system statuses. Then diagnosis can be performed using these values and system statuses and a decision can be made to either execute a configuration or reconfiguration procedure. Control actions can be performed by various elements of systems S1, S2, and S3 and verification of the execution of the actions can be obtained by the processing unit.

The centralized management device 102 can implement numerous functions such as system monitoring, providing information to the pilot, carrying out of system diagnoses, collaborating with other systems, providing functional interaction and automatic system management, while exhibiting a rationalized communication architecture, with centralized processing bringing about the operation, in a coordinated manner, of the individual elements or components of systems. According to one aspect, when a reconfiguration procedure is required, the central management device 102 can automatically generate control commands for automatically control of at least some of the actions to be executed. The control commands can then be automatically dispatched via links L1, L2, and L3, either in sequence or in parallel, to corresponding system managers. For example, when control commands are dispatched in sequence, the central unit 110 waits for a confirmation from a system manager for the execution of a prior control command before dispatching the next control command.

In some aspects, configuration and reconfirmation procedures can be simple and do not require complex interaction between various systems and can be performed by system managers M1, M2, and M3. For example, when configuration and reconfiguration procedures are performed on an electrical system, the electrical system's system manager can first recover the status and configuration of the elements or components of the electrical system, then carry out a diagnosis on the electrical system, recover an overall status of the aircraft and its operational needs, and through a logic sequence decide the necessary configuration or reconfiguration actions, dispatch appropriate control commands to the components of the electrical system, recover status and configuration information on the electrical system's components after the actions has been executed, and finally verify that the new statuses and states of each component of the electrical system show that each control command has been correctly executed.

Furthermore, the centralized management device 102 can also perform actions during maintenance procedures, via the central unit 110 and system managers M1, M2, and M3. The combination of the central unit 102 and the system managers makes it possible to take advantage of the network of system managers, because each system can be reached directly by maintenance devices without having to first connect to each item of equipment. The combination also takes advantage of a single central unit 110 which makes it possible to automatically manage various maintenance actions, carried out in sequence or in parallel, as well as possible conflicts in certain particular cases.

The centralized management device 102 can be configured to include an interface in the flight deck between the crew and the aircraft to manage the systems in normal or abnormal situations, and a single central unit 110 for the configuration or reconfiguration of multiple systems, making it possible to carry out certain tasks in sequence (as the crew currently carries them out), but also some in parallel, thus reducing the duration of the normal list management or of a fault resolution procedure. Furthermore, non-automatic management tasks can also be inserted into an automated sequence to provide aid to an aircraft maintenance procedure.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. An electronic centralized aircraft monitoring (ECAM) device for automatic management of configuration and reconfiguration procedures of a plurality of systems of an aircraft, the device comprising:
a central unit implemented using a non-transitory computer readable medium and a processor, the central unit for automatically generating, in normal or abnormal situations, when a configuration or reconfiguration procedure is required, control commands for automatic control of at least one action to be executed for one or both of the configuration or reconfiguration procedure;
data links for automatic dispatch of control commands to corresponding systems for automatic execution;
wherein the device is configured to detect and diagnose situations which require a configuration of a system or of multiple systems, and to make available lists of actions to be carried out for a configuration procedure; and
wherein the device is configured to detect and diagnose system failures and request a reconfiguration, and make available lists of actions to be executed for a reconfiguration procedure.

2. The device of claim 1, wherein the central unit is configured to automatically dispatch control commands to linked system managers; and
wherein the system managers, each of which is associated with one of the corresponding systems of the aircraft, are configured to automatically manage the execution of the actions to be carried out by elements of the system with which it is associated, both during a configuration and a reconfiguration, as a function of control commands received from the central unit.

3. The device of claim 2, wherein the system managers are configured to:
detect and diagnose situations which require a configuration of a system or of multiple systems;
detect and diagnose system failures and request a reconfiguration; and
control and carry out actions by elements of the corresponding systems and verify the execution of the actions.

4. The device of claim 2, wherein the central unit is further configured to dispatch and execute control commands during aircraft maintenance procedures, via the aircraft's system managers.

5. The device of claim 1, wherein the central unit further comprises a display unit and a man/machine interface.

6. The device of claim 1, wherein the central unit is configured to display on at least one screen of the display unit alert messages and lists of actions to be carried out for a configuration or a reconfiguration procedure.

7. The device of claim 1, wherein the central unit is configured to control the execution of the actions to be carried out, in a sequential or at least in part parallel order, as a function of the procedure considered.

8. The device of claim 1, wherein the central unit is configured to integrate non-automatic actions into a list of actions to be carried out.

9. A method for automatic management of configuration and reconfiguration procedures of a plurality of systems of an aircraft, the method comprising:
using an electronic centralized aircraft monitoring (ECAM) device comprising a central unit implemented using a non-transitory computer readable medium and a processor, the central unit for:
detecting and diagnosing situations which require a configuration of a system or of multiple systems;
detecting and diagnosing system failures and requesting a reconfiguration;
making available lists of actions to be carried out for a configuration or reconfiguration procedure;
automatically generating control commands for the configuration or reconfiguration procedures; and
automatically dispatching the control commands to corresponding systems for execution.

10. The method of claim 9, further comprising:
dispatching control commands to linked system managers automatically via a central unit; and managing execution of actions to be carried out by elements of the system with which it is associated automatically, both during configuration and reconfiguration, as a function of control commands received from the central unit, via system managers associated with corresponding systems of the aircraft.

11. The method of claim 10, further comprising accessing the device via a man/machine interface integrated into a display unit.

12. The method of claim 10, further comprising the central unit displaying on at least one screen of the display unit alert messages and lists of actions to be carried out for a configuration or a reconfiguration procedure via the central unit.

13. The method of claim 10, further comprising the central unit controlling execution of the actions to be carried out, in a sequential or at least in part parallel order, as a function of the procedure considered.

14. The method of claim 10, further comprising the central unit integrating non-automatic actions into a list of actions to be carried out.

15. The method of claim 10, wherein the system managers:
  detect and diagnose situations which require a configuration of a system or of multiple systems;
  detect and diagnose system failures and request a reconfiguration; and
  control and carry out actions by elements of the corresponding systems and verify the execution of the actions.

16. The method of claim 10, further comprising the central unit dispatching and executing control commands during the aircraft's maintenance procedures, via the aircraft's system managers.

17. A non-transitory computer readable medium having stored thereon executable instructions that when executed by a processor of a computer control the computer to perform steps comprising:
  at an electronic centralized aircraft monitoring (ECAM) device:
    detecting and diagnosing situations which require a configuration of a system or of multiple systems;
    detecting and diagnosing system failures and requesting a reconfiguration;
    making available lists of actions to be carried out for a configuration or reconfiguration procedure;
    automatically generating control commands for the configuration or reconfiguration procedures; and
    automatically dispatching the control commands to corresponding systems for execution.

* * * * *